(12) United States Patent
Lauder et al.

(10) Patent No.: US 7,796,470 B1
(45) Date of Patent: Sep. 14, 2010

(54) ACOUSTIC DETECTION OF WEAPONS NEAR TRANSPORTATION CENTERS

(75) Inventors: Gary Lauder, Atherton, CA (US); Remigius Shatas, Huntsville, AL (US); Robert L. Showen, Los Altos, CA (US); James G. Beldock, Mountain View, CA (US); Gary Holladay, Athens, AL (US)

(73) Assignee: Shotspotter, Inc., Mountain View, CA (US)

( * ) Notice: Subject to any disclaimer, the term of this patent is extended or adjusted under 35 U.S.C. 154(b) by 353 days.

(21) Appl. No.: 11/973,294

(22) Filed: Oct. 5, 2007

Related U.S. Application Data

(60) Provisional application No. 60/850,245, filed on Oct. 5, 2006.

(51) Int. Cl.
   *G01S 3/80* (2006.01)
(52) U.S. Cl. .................................................. 367/127
(58) Field of Classification Search ................. 367/118, 367/120, 124, 129, 906
   See application file for complete search history.

(56) References Cited

U.S. PATENT DOCUMENTS

| | | | | |
|---|---|---|---|---|
| 5,586,086 | A * | 12/1996 | Permuy et al. | 367/127 |
| 5,912,862 | A * | 6/1999 | Gustavsen et al. | 367/906 |
| 5,973,998 | A * | 10/1999 | Showen et al. | 367/124 |
| 6,178,141 | B1 * | 1/2001 | Duckworth et al. | 367/127 |
| 6,552,521 | B1 * | 4/2003 | Medelius et al. | 324/72 |
| 6,621,764 | B1 | 9/2003 | Smith | |
| 6,847,587 | B2 * | 1/2005 | Patterson et al. | 367/127 |
| 6,891,500 | B2 * | 5/2005 | Hall et al. | 342/465 |
| 7,474,589 | B2 * | 1/2009 | Showen et al. | 367/127 |
| 7,599,252 | B2 * | 10/2009 | Showen et al. | 367/127 |
| 7,710,828 | B2 * | 5/2010 | Barger et al. | 367/127 |
| 2008/0084788 | A1 * | 4/2008 | Showen et al. | 367/127 |
| 2008/0279046 | A1 * | 11/2008 | Showen et al. | 367/127 |

FOREIGN PATENT DOCUMENTS

WO  WO/2009/085361  * 7/2006

OTHER PUBLICATIONS

International Search Report and Written Opinion, received in corresponding PCT application No. PCT/US2008/078849.

* cited by examiner

*Primary Examiner*—Dan Pihulic
(74) *Attorney, Agent, or Firm*—DLA Piper LLP (US)

(57) ABSTRACT

Systems and methods are disclosed for determining location of a weapon firing incident. In one exemplary embodiment, there is provided a system for determining the location of a weapon firing incident in proximate position to a region traversed by vehicles. The system includes a first set of sensors associated with a first sub-region of the region, for detecting the weapon firing incident and for generating an output, and a processing component that determines a location of the weapon firing incident based upon the output. Moreover, the system may also include a second set of sensors arranged to detect the weapon firing incident along the travel path traversed by the vehicles and for generating a second output. Other exemplary embodiments may include arrangements of the sensors in patterns is associated with sub-regions and/or travel path as well as weapon fire location processing features.

22 Claims, 4 Drawing Sheets

ACOUSTIC DETECTION OF WEAPONS NEAR TRANSPORTATION CENTERS

CROSS REFERENCE TO RELATED APPLICATIONS

This application claims priority to U.S. provisional patent application No. 60/850,245, filed Oct. 5, 2006, which is incorporated herein by reference in entirety.

BACKGROUND

1. Field

The present invention relates generally to systems and methods for locating gunshot events and other weapons fired in real time, as well as to the field of security for transportation centers and associated vehicles.

2. Description of Related Information

A gunshot location system must often detect gunfire and other impulsive weapons in a complex and noisy acoustic environment. One such system is U.S. Pat. No. 5,973,998 entitled "Automatic Real-Time Gunshot Locator and Display System," which is incorporated herein by reference. An effective gunshot location system includes audio sensors able to detect impulses abrupt enough to be gunfire, synchronization and timing components to determine relative arrival times between single shots and/or multiple gunfire, and a location processor that utilizes arrival times or angles of arrivals. Some systems may also include visual and auditory presentation of the gunfire to a user of confirmed events on a map, which may include a presentation of current and past events, and a database containing measured pulses, derived locations, and user annotations.

SUMMARY

Systems and methods consistent with the invention are directed to determining location of a weapon firing incident and/or performing weapon fire location processing. According to one or more embodiments, an exemplary system for determining the location of a weapon firing incident in proximate position to a region traversed by vehicles is disclosed. The system may include a first set of sensors associated with a first sub-region of the region, for detecting the weapon firing incident and for generating an output, and a processing component that determines a location of the weapon firing incident based upon the output. Moreover, the system may also include a second set of sensors arranged to detect the weapon firing incident along the travel path traversed by the vehicles and for generating a second output. Other exemplary embodiments may include arrangements of the sensors in patterns associated with sub-regions and/or travel path as well as weapon fire location processing features.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various embodiments and aspects of the present invention and, together with the description, explain the principles of the invention. In the drawings, which pertain to an airport as a specific illustration of a transportation center.

DETAILED DESCRIPTION

Figure 1:
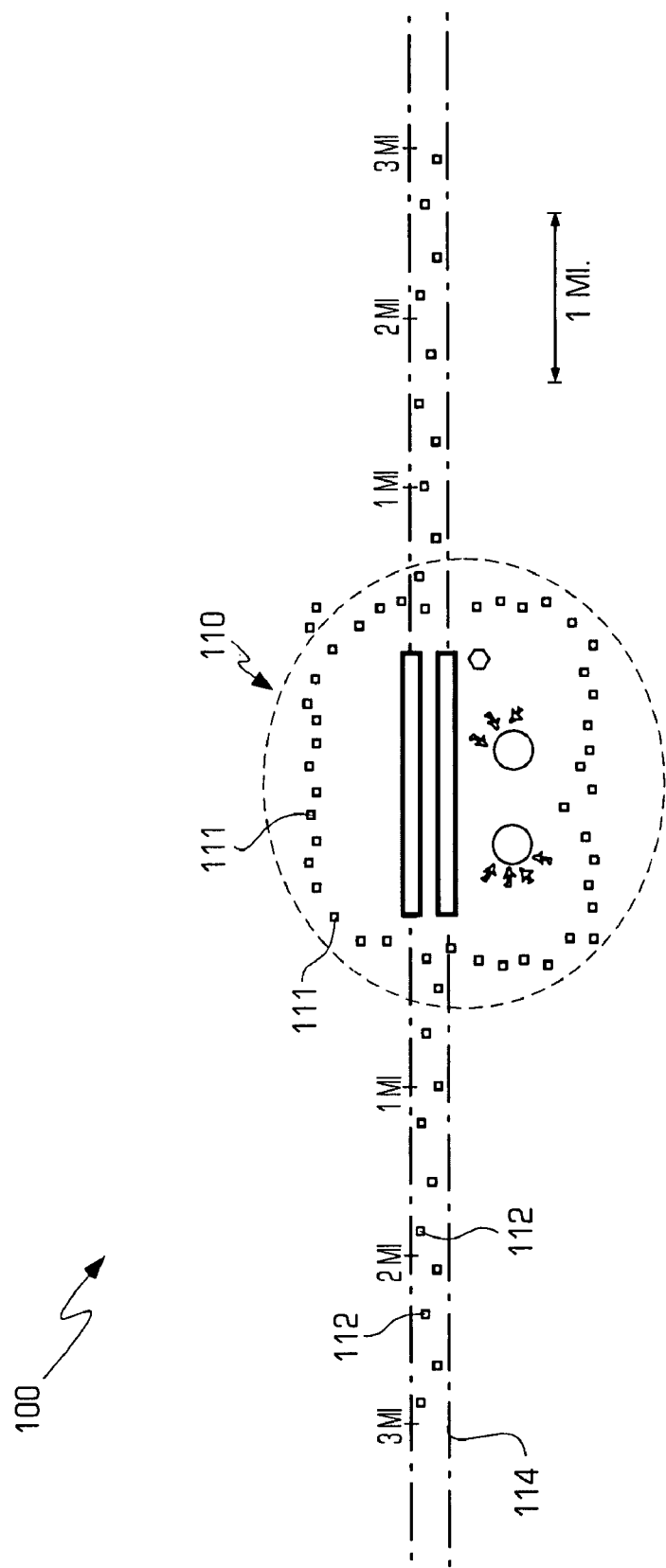
FIG. 1 is a simplified diagram of an airport including terminals and a pair of parallel runways protected by a perimeter of acoustic sensors, and by sensors placed along the flight paths consistent with certain aspects related to the present invention.

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Various transportation centers are potentially susceptible to attack from weapons which have strong acoustic signatures. Examples of such transportation centers include airports, train stations, bus or subway terminals, trans-shipment centers, shipping yards, docks, etc. These centers can be provided with protection via various gunshot location system arrays and features. In the following system descriptions, although airport defense systems may be stressed, it should be appreciated that such systems are provided as an illustration of one type of implementation of the inventions and innovations herein. As such, one of ordinary skill in the art would appreciate that the present invention may implemented in several ways to meet any of a plurality of applications not specific to airport defense systems.

Airports and low-flying aircraft are vulnerable to attacks from weapons which have a strong acoustic signature, such as rifles, shoulder launched rockets (MANPADS), and mortars. In one aspect, the present invention provides a modification of gunshot location systems presently employed in urban areas which help determine the location of the attack near an airport. The sensors in such systems are typically distributed uniformly throughout a region to be monitored. The invention disclosed herein, however, provides a system that strategically places acoustic sensors in an order that optimizes the accuracy and location of detected weapons fire, including muzzle or mortar explosions, the passage of bullets or rockets, and the impact sounds of the weapons. The relative arrival times and the angles of detection of the acoustic signatures allow for the location of the weapon(s) to be readily calculated. Alerts can then be passed to airport security, to vulnerable aircraft, to aerial weapons platforms for tactical targeting, and/or to command centers.

The threat to civil aircraft from terrorists is a very real possibility. Some of the threats considered here are summarized in table T-1 below, which includes weapon types, their ranges, and typical doctrines of engagement.

TABLE T-1

| Weapon type: | .50-cal rifle | Shoulder-fired rocket | Mortar |
|---|---|---|---|
| Range | 2 miles | ~3 mi | ~3 mi |
| Target type | Fixed and moving | Fixed and moving | Fixed only |
| Favorable geometry | Target is line-of-sight & has small sideways velocity so weapon is more accurate | | Can hit target hidden behind obstacles |

In an embodiment of the invention described here, an acoustic detection system provides protection for an airport and aircraft in the nearby airspace by detecting weapons fire (e.g., rifle, rocket or mortar), locating a source of the weapons fire, and thereby alerting defense forces to the source and target of the attack. Within such embodiment, the system may detect and report incoming weapons fire toward control towers, fuel depots, critical buildings, and aircraft on the ground, landing, or taking off.

The present invention provides a system for the strategic placement of acoustic arrays so as to best detect the most likely attack scenarios. In one particular embodiment, a system is provided for determining a location of a weapon firing incident in proximate position to a region where vehicles traverse the region. Within such embodiment, the system preferably includes a first set of acoustic sensors arranged along a travel path of vehicles associated with the region such that the first set of acoustic sensors provide a first output. Such a system also preferably includes a processing component that determines the location of the weapon firing incident based on the first output and data regarding the relative position of the sensors in the first set of sensors. The first set of sensors are then preferably arranged along the travel path so that a collection of sensors are arranged in a non-regularly spaced pattern along the travel path. For example, a first subset of sensors may be placed on a first side of the travel path so that they are staggered from a second subset of sensors placed on a second side of the travel path. As a result, the sensors across the travel path from each other are preferably offset to provide little or no pairs of sensors directly opposed from each other.

Within the above embodiment, a second set of sensors associated with a first sub-region containing fixed infrastructures may also be included for detecting the weapon firing incident and for generating a second output. For such embodiment, the processing component preferably determines the location of the weapon firing incident with more precision as a function of this second output.

In another aspect of the above embodiment, the processing component may perform weapon location routines including a determination of a threat location. Such a determination may, for example, be determined as a function of the location of a potential target within the first region, information regarding the travel path, information regarding the vehicles, information regarding weapon types, and to information regarding the likely location of a weapon source.

In another embodiment of the present invention, a first set of sensors associated with a first sub-region of the region is provided for detecting a weapon firing incident and for generating a first output. Within such embodiment, a second set of sensors is also preferably arranged to detect the weapon firing incident along a travel path for the vehicles traversing the region and for generating a second output. Preferably, the first set of sensors are arranged in a regularly spaced pattern about the first sub-region, whereas the second set of sensors are preferably arranged in a non-regularly spaced pattern about the travel path. The system then utilizes a processing component to determine the location of the weapon firing incident based upon the first output and the second output. Here, it should also be appreciated that the processing component may perform weapon location routines as previously described.

For the above embodiment, it should be further appreciated that several additional characteristics may be included. The first set of sensors, for example, may be arranged around a perimeter of the first sub-region so that adjacent sensors are placed sufficiently proximate to each other such that the projectile noise of a weapon fired into the first sub-region may be detected. Also, the second set of sensors may include acoustic sensors spaced outward along an entire length of, and substantially aligned with, the travel path to detect weapon incidents aimed at moving vehicles. Furthermore, with respect to the types of sensors used for either the first or second set of sensors, it should be appreciated that some embodiments may include an array of omni-directional acoustic sensors; sensors having one or both of azimuthal resolutions and/or elevation resolutions; and noise-monitoring microphones. The system may also include other types of sensors including optical sensors for detecting the optical flash of a weapon incident so as to provide a precise time of the weapon firing.

The above embodiment may also include additional characteristics with respect to the processing component. The processing component may, for example, use information about a transportation center layout and vehicle travel patterns to adapt computations related to the threat location. Such computation of a threat location may include use of one or both of a time of arrival (TOA) and/or an angle of arrival (AOA) information available via the system. For some of these computations, modifications could be customized so as to make them adaptable to airport and aircraft defense applications. Such modifications may be useful in that the system output could then be transmitted to any of various critical locations such as an airport tower, airport security, command centers, nearby aircraft, or aerial platforms. Here, it should also be appreciated that the first sub-region may include the central or tower region of an airport.

In one exemplary embodiment, it should also be appreciated that sensors are placed at relatively close intervals (e.g., ~500 ft separation) substantially around the airport perimeter. Such relatively close intervals allow for capturing sounds from incoming bullets or rockets to better determine if the sounds are an actual threat and to better determine source location. Muzzle blast and mortar launch sounds will also be captured, but for these sounds a more sparsely-spaced perimeter array could be used. Both time-of arrival (TOA) and angle-of-arrival (AOA) analysis can be employed, although in a simplified system the latter can be omitted. The redundancy from the use of azimuthal sensors (AOA) can be of assistance in improving the accuracy and sensitivity of detection.

According to some aspects, sensors are more infrequently spaced (approximately ¼ to ½ mile) along the landing and take-off approaches up to three miles beyond the ends of the runways. This will allow the detection of snipers firing away from the airport toward aircraft aligned with the runways. The snipers will usually have an easier time striking the targets if they are shooting aligned with the runways as then the sideways velocity of the aircraft with respect to the shooter is minimized.

A sniper disposed to attack a landing aircraft will likely select a position far enough from the perimeter to not be obvious yet close enough so that the aircraft height above ground will be small. Assumptions as to the sniper's consideration will determine how long the line of sensors on the approaches must be.

In certain circumstances when the landing pattern legs (cross-wind, down-wind and up-wind) often have large aircraft at low heights, then a sparse acoustic array can be extended under this entire pattern. In this case using a sparse array at larger distances, sensors with both azimuth and elevation discrimination can be utilized to know where the targets are and to measure the three dimensional (3D) direction of the rocket or bullet trajectory.

FIG. 1 shows an airport representative of the transportation centers of the present invention, including a recommended set of acoustic arrays. Exemplary system 100 illustrated in FIG. 1 is a simplified diagram of an airport, including terminals and a pair of parallel runways of length 5000 or more feet, surrounded by about fifty or more sensors (elements 110) arranged in an irregular pattern, for example, around a perimeter. In the example illustrated in FIG. 1, these individual perimeter sensors (111) are closely spaced, by about 500 feet from each other, to detect the sounds of bullets or rockets which have only a short detection range.

In addition, in line with the two runways are sets of ten or more sensors (112) beneath the anticipated flight paths of aircraft. These sensors are preferably arranged in an irregular pattern, spaced by 1300 to 2700 feet (or about ¼ to ½ miles) with slight sideways stagger out to about three or more miles beyond the runway on each side. With regard to the transportation centers and regions of interest vis-à-vis the instant disclosure, irregular placement and spacings (as illustrated here) allows fewer sensors to be used than would be required by using a regular in-line and periodic pattern. Sensors in a straight line will work, but they suffer from a higher likelihood of obtaining ambiguous locations. This is a valuable teaching (gained by experience of the inventors in previous urban gunshot location systems) that irregular spaced sensors are the best arrangement in a complex acoustic environment to achieve the desire location accuracy with the fewest number of sensors.

The sensors under the flight path can be placed in a more widely spaced manner as muzzle and launch sounds would be the primarily intended noises for detection by these sensors (although bullet or rocket sounds would also be detected for projectiles traveling close enough to the sensors).

As used herein, "regularly-spaced pattern" refers to placing the sensors in a straight line with periodic spacings. As also used herein, "irregular spaced pattern" refers to offsetting the sensors in a somewhat random manner, but still covering the area needed to be protected, so that the spacings are not uniform in either a north-south or east-west direction.

Figure 2:
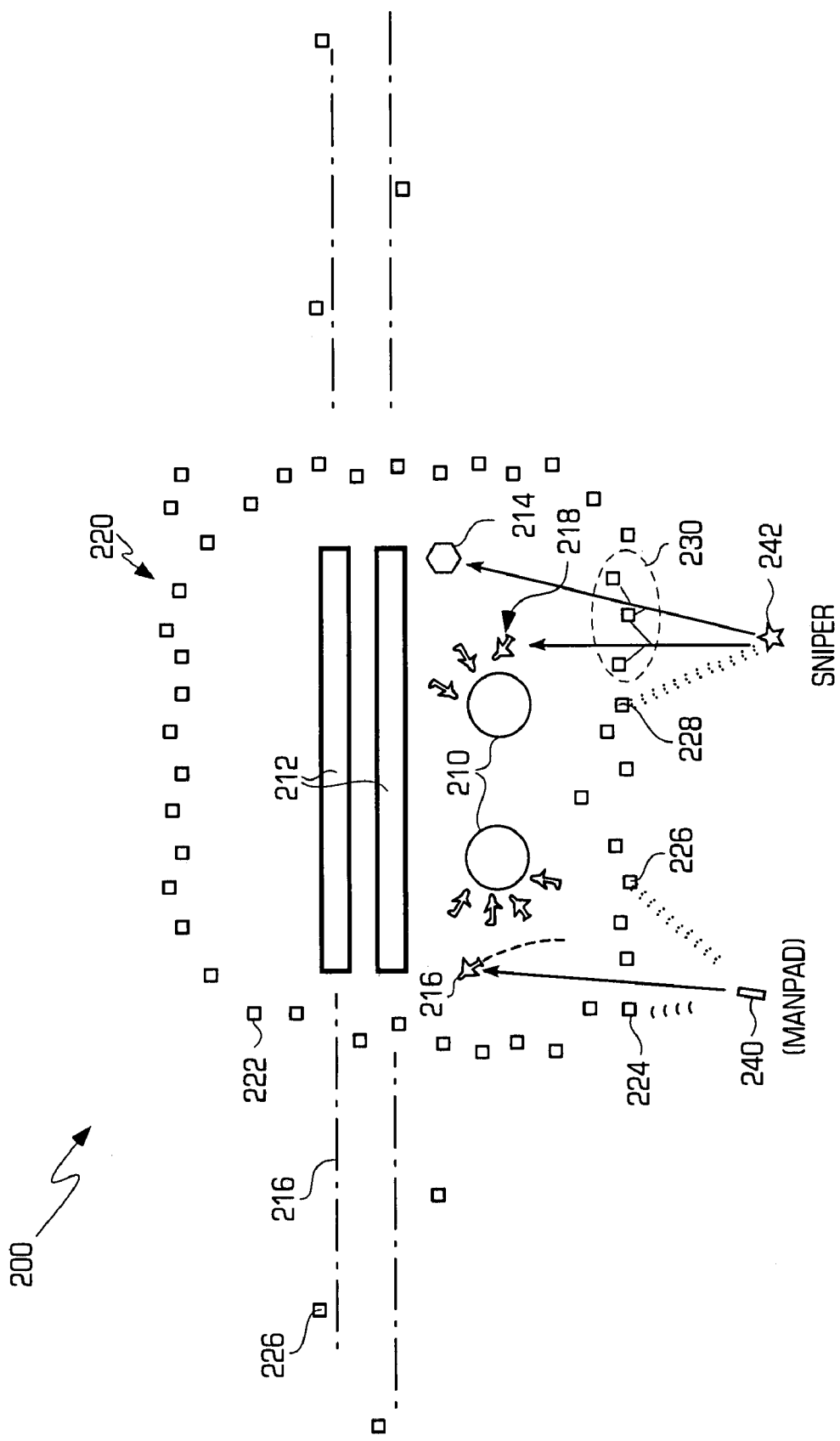
FIG. 2 shows an expanded view of the central portion of the airport, illustrating the perimeter defense and postulated attacks by a rocket and a rifle consistent with certain aspects related to the present invention.

FIG. 2 shows an expanded view of the central portion of the airport protection system (element 200), containing the airport terminals (210) and runways (212). A perimeter (220) of individual acoustic sensors (222) is illustrated. The perimeter sensors detect acoustic signals from incoming weapons, and information from the sensors allows location of the weapons which are displayed on a detailed map in real time.

The figure shows a shoulder-launched IR-guided rocket (manpad, element 240) directed toward a moving aircraft (216) on the ground. Sensors (224 and 226) detect the launch sounds and the rocket sounds. The figure also shows a sniper (242) positioned about one mile from a runway shooting toward the control tower (214) and a stationary plane (218) with sensors detecting the muzzle sounds (228) and sensors picking up both bullet and muzzle sounds (230).

Figure 3:
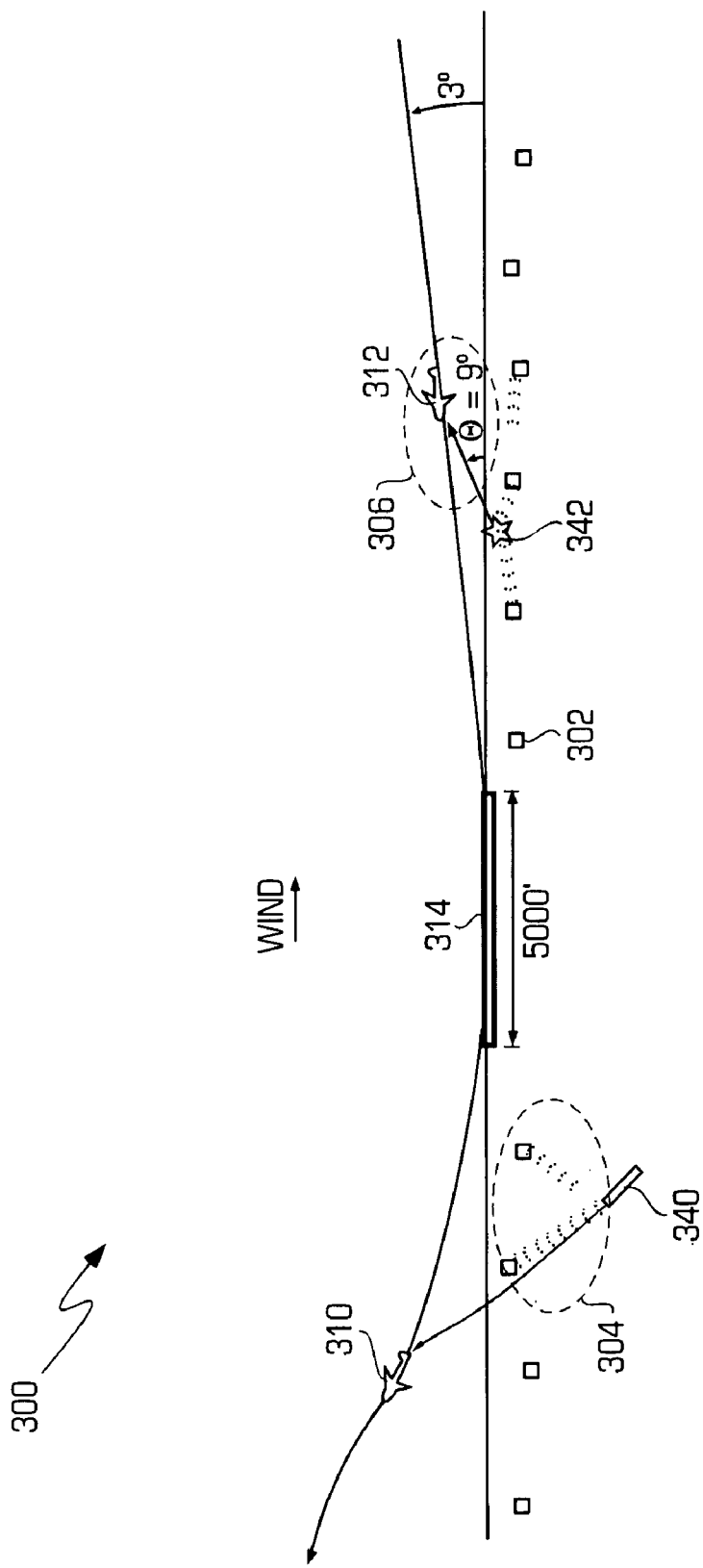
FIG. 3 is a horizontal view of the runway and near flight paths, showing sensor placement and postulated rocket and rifle attacks toward aircraft in the sky to consistent with certain aspects related to the present invention.

FIG. 3 diagrams a horizontal view (300) of runway (314) and flight paths under attack. Aircraft (310 and 312) are taking off and landing against the wind. The landing angle is shown as a 3 degree glide slope, the takeoff angle is much greater. Sensor (302) is one of many sensors extending from the runway to several miles on both sides of the runway under the flight paths. The first attack is from an IR-guided rocket launcher (340) directed toward an aircraft taking off (310), as detected by at least two sensors (304). Also attacking is a sniper (342) in line with the runways firing outward toward a landing aircraft (312). The sniper is postulated to be nearly in-line with the landing aircraft in a preferred geometry (306) so as to have a adequate time to shoot many rounds without having to change aim quickly. The angle of fire, here illustrated as 9 degrees or higher, is a convenient value to use without needing to radically sweep upward as the aircraft approaches. Of course, the sniper can choose to wait until the aircraft was much closer to the shooting position.

These sensors detect the associated sounds from the weapons fire, sent the arrival times or angles to a central computer which estimates locations, and display them on a screen with a map.

The system is effective against rocket propelled grenades (RPGs) and anti-aircraft artillery (AAA) on small mobile platforms such as jeeps.

Figure 4:
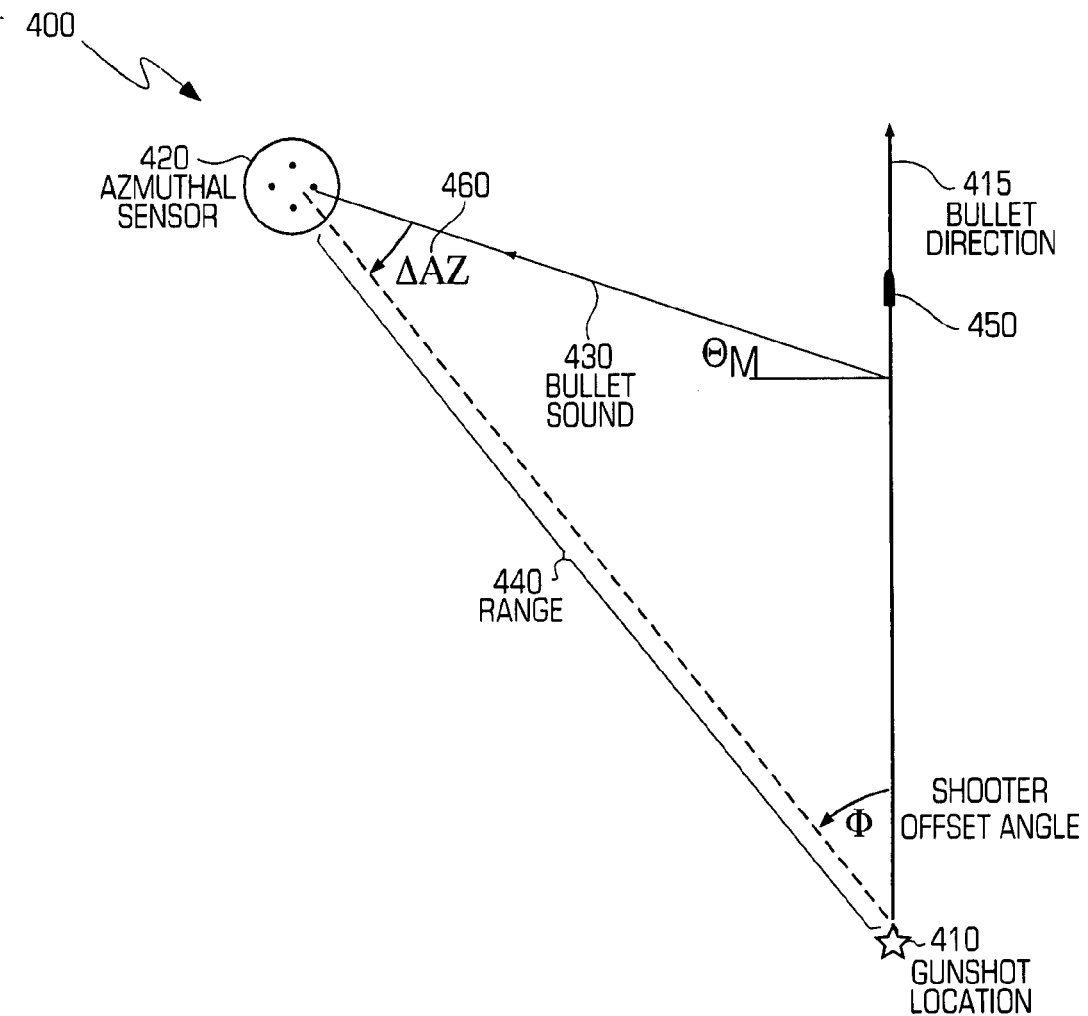
FIG. 4 is a view of the passage of a supersonic bullet near an azimuthal sensor, and a method to determine the range and location of gunfire consistent with certain aspects related to the present invention.

FIG. 4 illustrates the path of a bullet passing by a sensor, and the oblique path which the first arriving bullet sounds traverse. A triangle is formed, which can be solved to give in the first instance the range and location of a supersonic shot, and in the second instance, also provide the angle of the shooter with respect to, the single azimuthal sensor (420). The gunshot location (410) and the bullet direction (415) are presented The azimuthal sensor (420) measures the AOA of both bullet and muzzle sounds. The Range from the sensor to the gunshot is 425. This range can be calculated (as explained below) using only the two measured incident angles and the time difference between them, and the speed on sound, but does not bepend on the speed of the bullet.

Alerts of attacks may be passed to:
1. Airport security which will control mobile squads responding to the attack location;
2. Vulnerable aircraft, to permit them to take evasive actions;
3. Aerial weapons platforms for tactical targeting; and/or
4. Command centers for more integrated area response In one implementation, the system may be integrated with existing acoustic arrays surrounding major airports which are presently used for noise monitoring of aircraft. This may allow a more rapid implementation of an initial detection capability. Such sensors would have to be modified to report impulsive sounds and not just average noise.

The type of acoustic sensors to be used will be selected depending on the array and the postulated threat, although the most important consideration will be the array positions and the routines used to calculate trajectories and locations. The acoustic sensors can vary from the simplest omni-directional to azimuthal and finally to azimuthal-elevation devices. In principle, a simple omni sensor is adequate if the array is dense enough to permit calculation of trajectories and launch or impact locations even when the sounds are coming from supersonic projectiles.

However, the array can be less dense and ambiguities can be corrected easier if the angles are also measured at some or all of the sensors. Additionally, a given size array can detect unambiguously to greater ranges if the angle are measured. Present Gunshot Location Systems using combined angle and timing information are superior in complex urban areas with acoustic path blockage, echoes and extraneous sounds, so it is advantageous to use the more complex sensors.

The complementary use of time of arrival (TOA) and angle of arrival (AOA) sensors in a gunshot location system is explained in detail in U.S. patent application Ser. No. 11/546,529, submitted 10 Oct. 2006, now U.S. Pat. No. 7,474,589, by inventors Robert Showen, Robert Calhoun, and Jason Dunham titled "Locating Gunshots using combined AOA and TOA information," which is incorporated herein by reference.

The details of determining trajectory of bullets in three dimensions have previously been disclosed.

A supersonic bullet passing nearby a sensor will shed sounds arriving at that sensor before the muzzle blast arrives. This is illustrated in FIG. 4, where the gunshot location (410), shot direction (415), bullet sound (425), and azimuthal sensor (420) are shown in a triangular configuration.

The initial supersonic bullet sound arrives at an offset from the direction to the muzzle by an amount $\Delta AZ$ which is included in the relationship $$\text{Range}=V_s*\Delta T_{bm}/(1-\cos(\Delta AZ))$$

The other variables are range to shooter, velocity of sound, and difference in arrival time between bullet and muzzle sounds. This relationship is found by calculating that sounds from the uniformly speeding bullet jumps off at an angle to the sensor which obeys Fermat's principle of least action (here least time). The relation can be solved for either range or angular offset. For a single sensor measuring the delta angles and times for the bullet and muzzle sounds, the range is determined. It is interesting to note that this equation for range does not contain the bullet velocity, which is certainly counter-intuitive. There is a distinct advantage in not to having to know the bullet velocity to find range (and hence shooter location, as the muzzle azimuth is also known). In deriving this final equation, the bullet velocity drops out by using sum or difference trigonometry identities, and the bullet velocity effects are subsumed into the $\Delta Az$ parameter.

Using the measured $\Delta AZ$ from above relation can give the shooting direction if the range and bullet Mach number are otherwise known. In that case, the shooting offset direction from the sensor is given by $\phi=90-(\Theta_M+\Delta AZ)$, where $\Theta_M$ is $\sin^{-1}(1/M)$, and where M is Mach number of the bullet, $M=V_{bullet}/V_s$.

In complex urban environments with many reflections or blockages from buildings, Azimuthal sensors can distinctly assist in avoiding location errors. For example, AOA information from one sensor in the collection of acoustic sensors may be used to disregard TOA information from that sensor if the AOA information is inconsistent with the location of an event determined from other sensors, which implies the signal arriving at the sensor was probably reflected. Alternatively, AOA information may be used to resolve an ambiguity in candidate locations computed when a detection using three sensors (spaced in a very oblique triangle) gives two mathematically valid triangulations.

Also, AOA measurements in a quasi linear geometry permit the sensors to be spaced farther apart and still obtain confirmation of a valid location. For example a location solution from just two sensors is feasible, as intersecting azimuthal directions plus an intersecting hyperbola from the two sensors can confirm a location.

If the acoustic array is non-planar, then angular resolution in both azimuth and elevation is possible. With well known processing methods, the direction to a source in three dimensions (3D) can readily be found. The non-planar array can be created by well-separated single microphone sensors placed in a 3D arrangement, OR the use of sensors in a planar array with several non-planar microphones in each sensor, OR a combination of both.

In circumstances where an optical flash is produced at weapon launch or impact and that flash is readily detectable, it can be incorporated with the sonic information to more readily calculate trajectories and locations. For example, at a rocket, a mortar, or rifle blast a detectable flash indicates the exact launch time (even if an angle is not measurable from the flash) which means one less acoustic input is required to solve for the locations. In general, if the time of an optical flash is 0.20 measured, this time can significantly improve locations determined by acoustic data alone, especially if the weapon is outside of the acoustic array.

The sounds from rifles, rockets and mortars are readily distinguishable from each other. In some cases specific rifle types can also be distinguished either from muzzle blast intensity or bullet velocity and characteristics; thus the sound from a .50-cal weapon can be separated from a more normal, less threatening weapons often used in urban areas. Also, types of weapons and aircraft engines can be classified using a library accessed in real-time.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe source code editing components such as software, systems and methods consistent with the present invention may be implemented with any combination of hardware, software and/or firmware. Moreover, the above-noted features and other aspects and principles of to the present invention may be implemented in various environments. Such environments and related applications may be specially constructed for performing the various processes and operations according to the invention or they may include a general-purpose computer or computing platform selectively activated or reconfigured by code to provide the necessary functionality. The processes is disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the inven-

The invention claimed is:

1. A system for determining a location of a weapon firing incident in proximate position to a region where vehicles traverse the region, said system comprising:
    a first set of acoustic sensors arranged along a travel path of vehicles associated with the region, wherein the first set of acoustic sensors provides a first output; and
    a processing component that determines the location of the weapon firing incident as a function of the first output and data regarding relative position of sensors in the first set of sensors;
    wherein the processing component is configured to:
        process time of arrival (TOA) information associated with muzzles blasts and known positions of the sensors to calculate candidate locations of the weapon firing incident; and
        disregard TOA data as a function of associated AOA information being inconsistent with an incident location determined from other sensors, which permits the processing component to avoid erroneous TOA values from reflected paths;
    wherein the set of sensors is arranged along the travel path and includes a collection of sensors arranged in a non-regularly spaced pattern along the travel path, with sensors on a first side of the travel path being staggered from sensors of a second side of the travel path such that sensors across the travel path from each other are offset to provide few or no pairs of sensors directly opposed from each other.

2. The system of claim 1 wherein the processing component is configured to:
    compute multiple candidate locations of a detected gunshot from the time-of-arrival and angle-of-arrival information; and
    select a best candidate location as an actual gunshot location from among the computed candidate locations, wherein the best candidate location has a larger quantity of compatible time-of-arrival impulses and angle-of-arrival directions events from the acoustic sensors, than comparable quantities of compatible events associated with one or more false candidate gunshot locations.

3. The system of claim 1 wherein the processing component performs weapon location routines comprising a determination of a threat location as a function of the location of a potential target within the first region, information regarding the travel path, information regarding the vehicles, information regarding weapon types, and information regarding the likely location of a weapon source.

4. A system for determining a location of a weapon firing incident in proximate position to an airport, said system comprising:
    a first set of sensors associated with a first sub-region surrounding a central portion of the airport, for detecting the weapon firing incident into the airport facilities and for generating a first output;
    a second set of sensors arranged to detect the weapon firing incident at aircraft landing or taking off along a travel path for the vehicles traversing the region and for generating a second output; and
    a processing component that determines the location of the weapon firing incident, wherein the processing component is configured to:
        process time of arrival (TOA) information associated with muzzles blasts and known positions of the sensors to calculate candidate locations of the weapon firing incident; and
        disregard TOA data as a function of associated AOA information being inconsistent with an incident location determined from other sensors, which permits the processing component to avoid erroneous TOA values from reflected paths;
    wherein the first set of sensors are arranged in a regularly spaced pattern about said first sub-region; and
    wherein the second set of sensors are arranged in a non-regularly spaced pattern about the travel path;
    wherein the processing component performs weapon location routines comprising a determination of a threat location as a function of the location of a potential target within the first region and information regarding the travel path.

5. The system of claim 4 wherein the processing component further performs threat location routines as a function of information regarding a likely location of a weapon source.

6. The system of claim 4, wherein the first set of sensors are arranged around a perimeter of the first sub-region that includes a central airport facility, wherein adjacent sensors are placed sufficiently proximate to each other such that a noise of a projectile fired into the first sub-region may be detected.

7. The system of claim 6 wherein the first set of sensors includes an array of omni-directional acoustic sensors.

8. The system of claim 6 wherein the first set of sensors includes sensors having one or both of azimuthal resolutions and/or elevation resolutions.

9. The system of claim 6 wherein the first sub-region is a tower region of an airport.

10. The system of claim 4 wherein the second set of sensors includes acoustic sensors spaced outward along an entire length of, and substantially aligned with, the travel path to detect weapon incidents aimed at flying aircraft.

11. The system of claim 10 wherein the second set of sensors includes an array of omni-directional acoustic sensors.

12. The system of claim 10 wherein the second set of sensors includes sensors having one or both of azimuthal resolutions and/or elevation resolutions.

13. The system of claim 4 further comprising an optical sensor that detects an optical flash of a weapon incident to provide a precise time of the weapon firing.

14. The system of claim 4 wherein the processing component uses information about a transportation center layout and vehicle travel patterns to adapt computations related to the threat location.

15. The system of claim 1 wherein the data from the sensors can be one or both of TOA data and/or AOA data, wherein the system is configured to use the AOA data to disregard reflected signals.

16. The system of claim 14 wherein the computations are adapted to airport and aircraft defense.

17. The system of claim 4 wherein an initial group of the first set of sensors or the second set of sensors are comprised of noise-monitoring microphones.

18. The system of claim 17 wherein the initial group of sensors are comprised of previously-existing noise-monitoring microphones.

19. The system of claim 4 wherein a system output is transmitted to a location chosen from a group consisting essentially of an airport tower, airport security, command centers, nearby aircraft, or aerial platforms.

20. The system of claim 1 wherein the transportation hub is a subway or other indoor transportation location.

21. The system of claim 20 wherein a set of sensors is spaced in a substantially linear fashion in a subway station to detect weapons fire data.

22. The system of claim 21 wherein the data from the sensors can be one or both of TOA data and/or AOA data, wherein the system is configured to use the AOA data to disregard reflected signals.

* * * * *